INVENTORS
Osamu Jinushi
Yoshio Hasegawa
Zakuji Hasaoka

BY Watson, Cole, Grindle & Watson
ATTORNEYS

United States Patent Office 3,421,246
Patented Jan. 14, 1969

3,421,246
ELECTRIC NIGHT FISHING FLOAT
Osamu Jinushi, Yoshio Hasegawa, and Takuji Hossaka, Osaka, Japan, assignors to Yuasa Battery Company, Limited, Takatsuki, Osaka Prefecture, Japan
Filed July 7, 1966, Ser. No. 563,495
Claims priority, application Japan, Dec. 30, 1965, 41/48
U.S. Cl. 43—17.5        3 Claims
Int. Cl. A01k 93/00

ABSTRACT OF THE DISCLOSURE

An electric night fishing float comprising comprising a hollow body and a hollow cap, said hollow cap forming an illuminating chamber containing a miniature bulb and lead wires connected electrically to metal strips provided in a sealing block, said sealing block being fitted into the hollow cap, said hollow body having holes for allowing sea water to pass therethrough and forming a battery chamber for containing a sea water battery therein, said sea water battery being electrically connected to said metal strips.

---

This invention relates to a bob or casting float for fishing lines and more particularly to a float having an electrically illuminating means therein and which is adapted for night fishing.

As an electric float for night fishing the use of such an electric fishing float was suggested in which a dry battery and a small electric bulb connected therewith be contained so as to be lit at night time. But the idea suggested has a disadvantage that will be made apparent hereinafter.

A dry battery is adversely affected by moisture, particularly sea water, and may be short-circuited completely. Accordingly, it is necessary to make the joint between a hollow body and a hollow cap water-tight. This fact necessarily involves a complicated process of manufacture and accordingly a high cost. Furthermore, it is impossible to prevent the permeation of water through the joint during a long period of use.

A primary object of this invention is to provide an electric fishing float simple in manufacture by the use of a sea water battery.

Another object of the invention is to provide a compact type of electric fishing float which can be inexpensively produced.

Still another object of the invention is to provide an electric fishing float of such a construction that will permit a sea water battery and a light bulb connected therewith to be easily replaced.

Other objects and features of the invention will be understood more clearly from the detailed description to be made hereinbelow with reference to the accompanying drawings in which.

Figure 1:
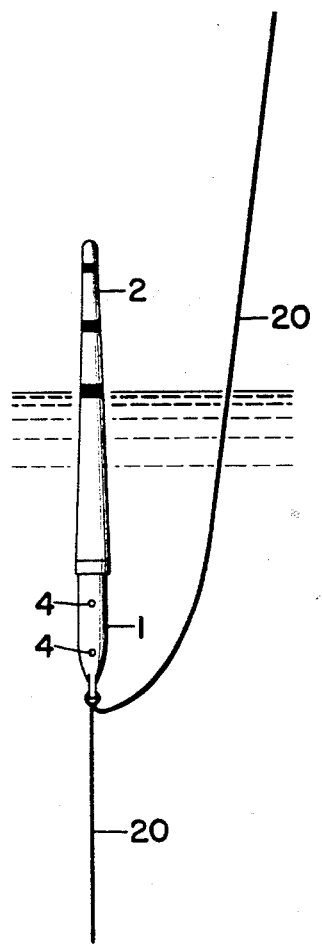
FIG. 1 is a side elevation of an embodiment of an electric fishing float according to the invention showing the float being used with a fishing line attached thereto.
Figure 2:
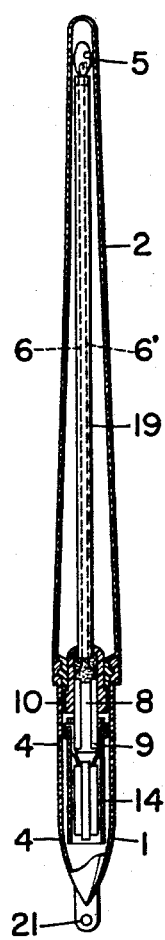
FIG. 2 is a sectional elevation of the float.
Figure 3:
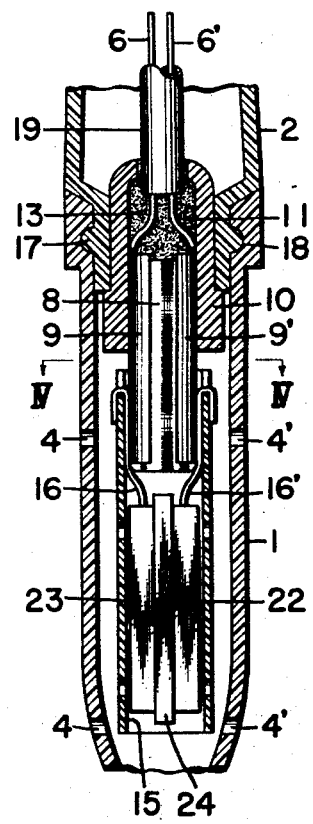
FIG. 3 is an enlarged sectional view of an electric connection element and sealing block attaching portion of FIG. 2.
Figure 4:
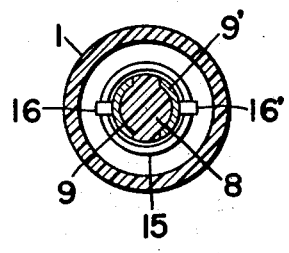
FIG. 4 is a sectional view taken along line IV—IV of FIG. 3.

Referring now to the drawings, an electric float for night fishing formed of plastic resin, such as polypropylene or polystyrene, is formed in two portions i.e., a hollow body 1 and a hollow cap 2, and the upper end of a sealing block 10 is fitted into the lower end of the hollow cap 2 and adhered securely thereto. The hollow body 1 is threaded on or otherwise secured to the lower portion of the hollow cap. Into the interior 11 of the sealing block 10 is fitted a cylindrical plug 8 formed of an insulating substance, said cylindrical plug 8 having two gutter-shaped metal strips 9 and 9' adhered thereto, said metal strips 9 and 9' being semi-circular in section and free from corrosion by sea water. Lead wires 6 and 6' are electrically connected at the lower end thereof to said metal strips 9 and 9', said lead wires being fitted at the lower ends thereof into the interior 11 of block 10 and extended through a protecting tube 19 long enough to reach the top of the hollow cap, and connected at the terminal thereof by a miniature bulb 5. The interior 11 of said sealing block 10 is loaded with an insulating filler 13 and kept water-proof. The hollow body 1 is provided on the side thereof with upper and lower apertures 4 and 4' through which sea water passes, and at the lowermost end thereof with a hole 21 through which a fishing line 20 is passed. Said hollow body 1 receives a silver chloride sea water battery 14 which comprises a positive electrode formed of silver chloride 22 and a negative electrode formed of magnesium 23. Said battery 14 is enclosed with a relatively elastic tubular envelope 15 made of synthetic resin and having openings at both ends thereof. The battery leads 16 and 16', which are respectively attached to the negative electrode and the positive electrode, are extended from within the envelope through slots in the envelope wall so as not to contact with each other, and are bent over against the outer side of the envelope wall. The relatively elastic envelope 15 is preferably made equal to, or slightly smaller in diameter than, the plug 8 so that it can be expanded circumferentially to fit snugly thereover, and to establish contact between the battery leads 16, 16' and the metal strips 9, 9' respectively. The elasticity of the envelope not only provides good electric connection but simplifies replacement of parts and ensures tight fitting through a mere act of insertion.

The envelope 15 described above is preferably provided on the surface thereof with fine holes that permit sea water to pass therethrough. The battery comprises an elongated silver chloride positive electrode 22 and a magnesium electrode 23 of the same shape with a separator 24 of water-absorbent fibers disposed therebetween, said positive and negative electrodes being enclosed within envelope 15. In order to connect the hollow body to the hollow cap, the hollow cap is provided on the periphery at the lower end thereof with a small circular protrusion 17 which is snapped into tight engagement with a corresponding circular groove 18 formed on the periphery of the upper end of the hollow body, thereby to preclude possibility of the two portions being disconnected from each other in use. Alternatively, the body and cap may be threaded together. In order to protect the bulb and the lead wires and keep same securely in position, it is preferable to provide a protecting tube 19 formed of plastic resin.

When the float attached to a fishing line is cast into the sea, the float remains at the water surface in a vertical position wherein sea water comes in through the small holes of the body portion to activate the sea water battery and light the bulb on the top portion of the float to afford clear sight to an angler at night. The float may be used during daytime with the battery removed therefrom.

Since the battery that is activated by sea water is used in the float of this invention, water-tightness of the joint between the hollow cap and the hollow body need not be so tight as in conventional types of floats which are operated by a dry battery and in which particular care must be taken to secure water tightness.

Therefore, the float of the invention is simple in manufacture and low in cost, and eminently suitable for mass production.

The sea water battery for use in the float of the invention has a large electric capacity for its volume, and particularly for use of a silver-chloride magnesium battery makes possible a suitable size of plate. Thus, this sea water battery has an electric capacity proportionate to the service hours thereof such as 5-hour service, 10-hour service or the like.

Furthermore, the miniature bulb for use in the float of the invention allows the use of small size bulbs besides those of a conventional size, and is produced by sealing a tungsten filament directly in glass. The metal strips are preferably made of metal free from corrosion by sea water such as, for example, nickel, stainless, silver, silver-plated copper or the like.

As for keeping of the electric night fishing float while not in use, the float itself may be left as it is, but since the sea water battery is activated by water or sea water, self-discharge resulting from contact with moisture when kept unused may impair the battery. Accordingly it is advisable to carry a spare battery in a tightly sealed polyethylene container, said spare battery being disposed in a tubular envelope of relatively elastic synthetic resin. Placing of a drying agent such as silica gel in the envelope is desirable.

It is to be understood that this invention is not limited to the specific embodiment thereof but that various changes and modifications may be made therein without departing from the scope and spirit of the invention.

What is claimed is:

1. An electric night fishing float comprising a hollow body and a hollow cap, said hollow cap forming an illuminating chamber containing a miniature bulb having lead wires connected electrically thereto, a sealing block, said sealing block being fitted into said hollow cap and having spaced metal strips extending longitudinally thereof to which said lead wires are electrically connected, said hollow body having holes for allowing sea water to pass therethrough and forming a battery chamber, a sea water battery in said body, said sea water battery having battery leads connected to said metal strips, and a relatively elastic tubular envelope enclosing said battery and said envelope being permeable by sea water to permit energization of said battery.

2. An electric night fishing float as in claim 1 in which said metal strips are peripherally mounted on a cylindrical plug fitted into said sealing block, said battery leads being extended from within the envelope through slots in the envelope wall and bent over against the outer side of the envelope wall so that said elastic envelope may be fitted over said plug to engage said metal strips and said battery leads.

3. An electric night fishing float comprising a hollow body and a hollow cap removably attached to said body, said hollow body having holes for allowing sea water to pass therethrough and forming a battery chamber, a sea water battery in said chamber, said hollow cap having a sealing block attached to the lower end thereof, said sealing block being provided with spaced metal strips, a miniature bulb in said hollow cap having lead wires connected to said metal strips, said sealing block extending into said body, said sea water battery being electrically connected to said metal strips, and a relatively elastic tubular envelope having at least one opening therein and embracing said battery and said metal strips to secure the same together and to effect an electrical connection between said battery and said strips.

References Cited

UNITED STATES PATENTS

| | | | |
|---|---|---|---|
| 2,527,956 | 10/1950 | Peevey | 43—17.5 |
| 2,546,516 | 3/1951 | Nardi | 43—42.06 |
| 2,549,077 | 4/1951 | Garth | 43—42.06 |
| 2,757,475 | 8/1956 | Pankove | 43—17.1 |
| 2,920,318 | 1/1960 | Balcken et al. | 43—17.1 X |
| 3,041,771 | 7/1962 | Hreno | 43—17.5 |
| 3,292,294 | 12/1966 | Beach et al. | 43—17.5 |

ALDRICH F. MEDBERY, *Primary Examiner.*

DANIEL J. LEACH, *Assistant Examiner.*

U.S. Cl. X.R.

43—42.06